April 20, 1943.    R. L. TEMPLIN    2,316,914
EXTENSOMETER
Filed Oct. 21, 1941    2 Sheets-Sheet 1
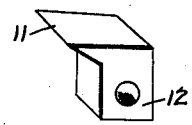
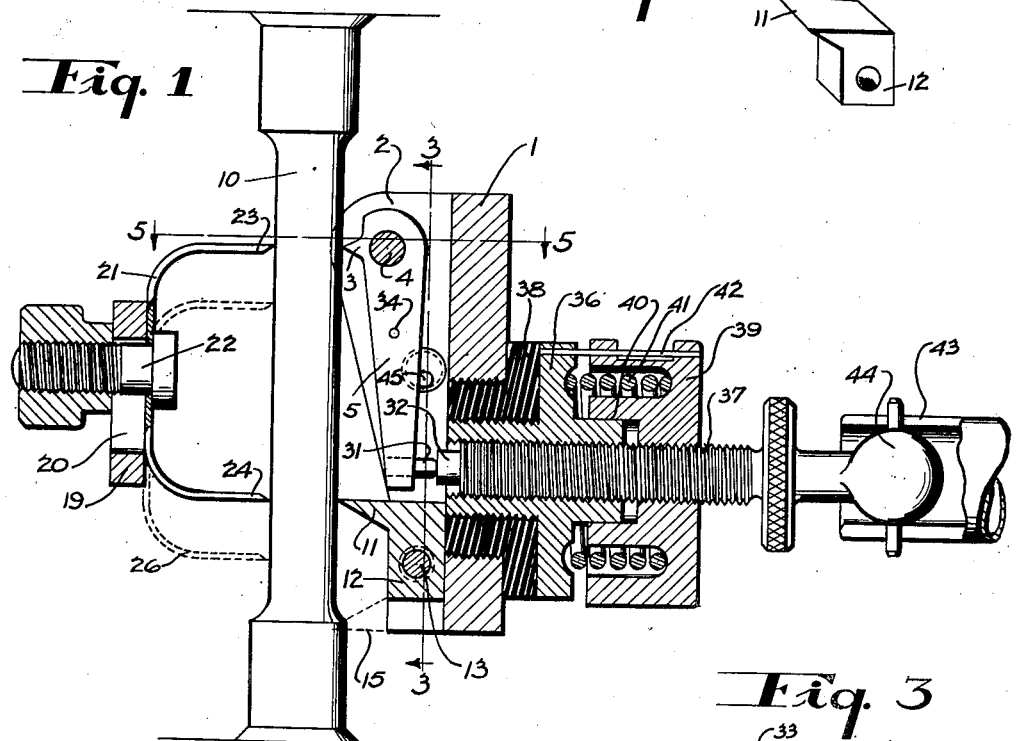
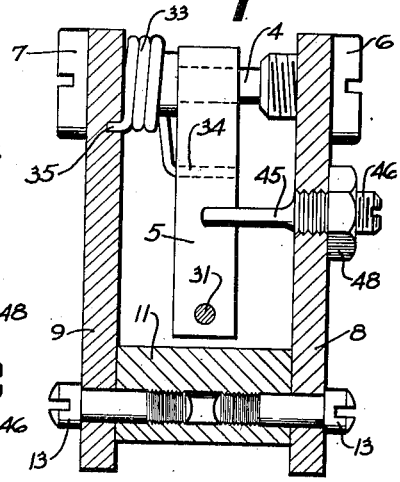
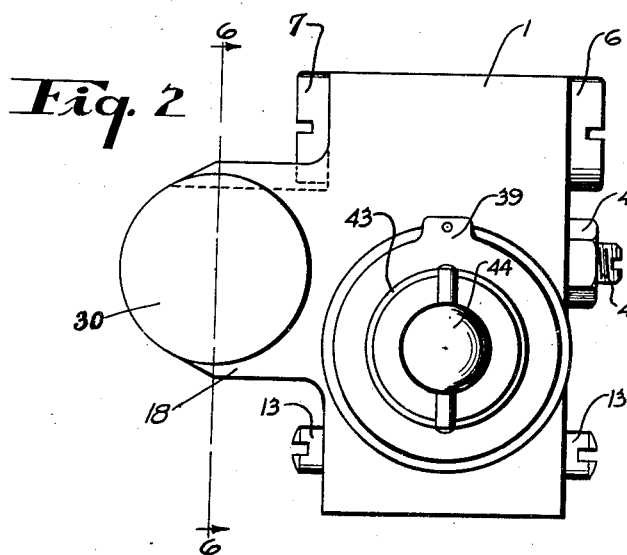
INVENTOR
RICHARD L. TEMPLIN
BY
ATTORNEY

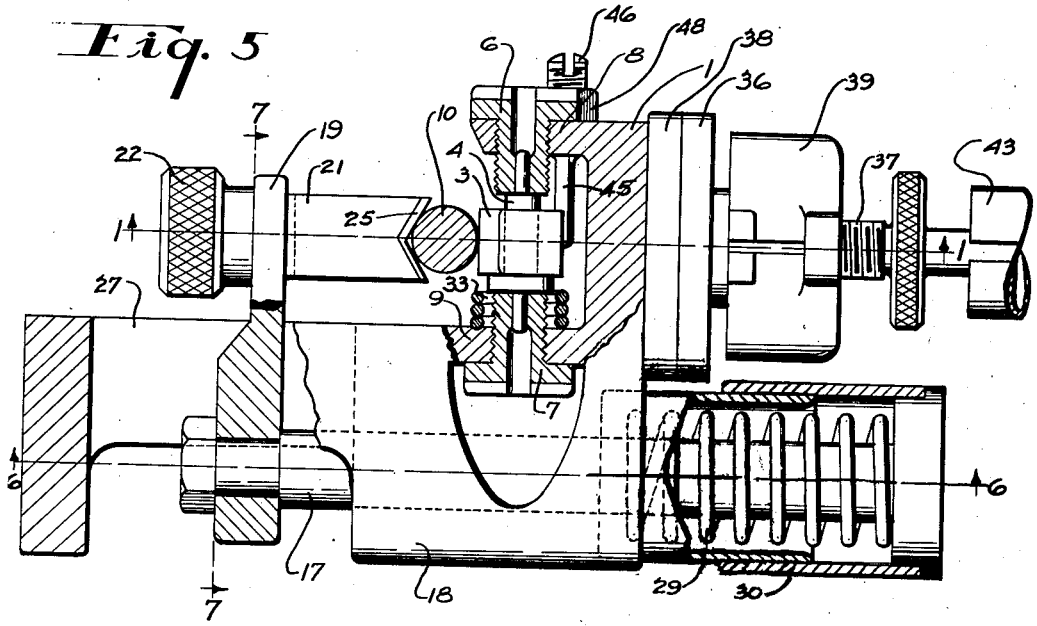
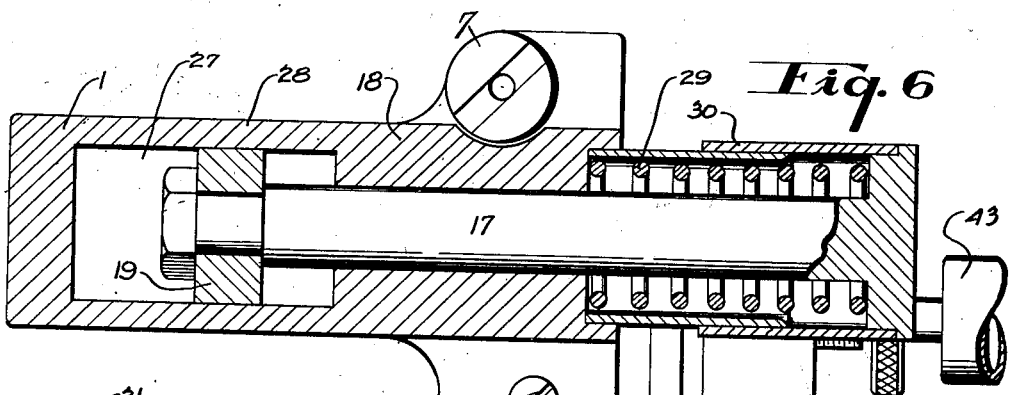
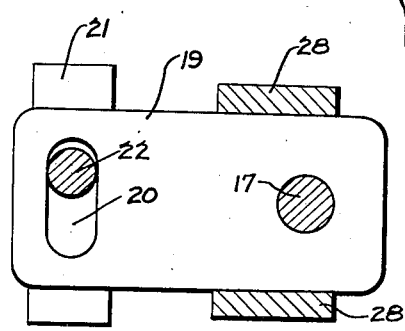

Patented Apr. 20, 1943

2,316,914

UNITED STATES PATENT OFFICE 2,316,914

EXTENSOMETER

Richard L. Templin, New Kensington, Pa.

Application October 21, 1941, Serial No. 415,902

4 Claims. (Cl. 33—148)

This invention relates generally to strain followers such as are used in materials testing and more particularly to a strain follower for autographic extensometers.

As disclosed in my Patent No. 2,091,534 on autographic extensometers, the strain of a test specimen is automatically recorded on a power driven recorder and the power therefor is controlled by electrical contacts forming part of the strain follower mechanism. As the specimen elongates the contacts are separated thereby momentarily causing an external source of power to operate a follow-up mechanism to re-establish engagement of the contacts and at the same time a curve is traced by pen and ink on a suitable recording chart.

It is an object of my invention to provide an improved strain follower that is especially adapted for autographic recording as above described, although it will of course be understood that certain features of construction and operation of my improved strain follower may be employed in other types of strain followers or strain indicating or recording systems.

Another object is to provide an improved strain follower that is particularly applicable to specimens of extremely small diameter and gauge length. A further object is to provide an improved strain follower that is adapted to be applied not only to specimens of extremely small diameter and of small gauge length, but is also adapted to be applied to small size specimens of different diameters and different gauge lengths.

A still further object is to provide an improved strain follower of very small size having a high degree of lightness, balance and ease of manipulation, accuracy, elimination of backlash and a zero stop, together with service durability, compactness and economical construction considering the precision qualities of the instrument.

Other objects and advantages will be more apparent to those skilled in the art from the following description of the accompanying drawings in which:

Fig. 1 is a vertical section taken substantially on the line 1—1 of the plan view of Fig. 5;

Fig. 2 is an end elevation of the gauge viewed from the right side of Figs. 1 and 5;

Fig. 3 is a vertical transverse section taken substantially on the line 3—3 of Fig. 1;

Fig. 4 is a perspective of one of the gauge points;

Fig. 5 is a sectional plan view taken substantially on the line 5—5 of Fig. 1;

Fig. 6 is a vertical section taken substantially on the lines 6—6 of Figs. 2 and 5; and Fig. 7 is a transverse section taken substantially on the line 7—7 of Fig. 5.

The specific embodiment of the invention as illustrated in the drawings is largely magnified from the actual size instrument, this being done for purposes of clarity, although certain principles of the invention may be employed in strain followers of large sizes. The device comprises, as shown in Fig. 1, a frame 1 having a vertical channel or groove 2 in which a gauge point 3, supported upon a pivot pin 4, is formed as a part of an electrical contact lever 5. As shown in Fig. 5, the pivot pin 4 is suitably journaled in removable screws 6 and 7 extending through side walls 8 and 9 of the frame 1. The side walls at their upper ends preferably extend forwardly toward a specimen 10, Fig. 1, and then taper downwardly to a point adjacent a lower normally fixed gauge point 11. This fixed gauge point is formed preferably as an integral part of a block 12 which is removably held in the channel 2 by a pair of pins 13 which, as shown in Fig. 3, extend through the two side walls 8 and 9 and are threaded into block 12. The full line position of gauge point 11, as shown in Fig. 1, establishes a certain minimum gauge length between points 3 and 11 whereas if a longer gauge length is desired, then block 12 is removed from the frame channel by first disconnecting pins 13 and reinserting the block in an inverted dotted line position 15. Pins 13 are then inserted to firmly hold the gauge point 11 in its new fixed position. The gauge length is thereby enlarged.

To hold the gauge points 3 and 11 in contact with the specimen and at the same time insure a symmetrical arrangement of the holding force on the gauge points regardless of whether they are arranged for a short or long gauge length, I provide as shown in Figs. 5 and 6 a spring pressed plunger 17 suitably guided in a circular boss 18 projecting laterally from the frame 1 adjacent side wall 9. The outer end of plunger 17 carries a transverse arm 19 which is provided with a vertical slot 20, Figs. 1 and 7. A U-shaped clamping member 21 is secured to arm 19 by a bolt and nut 22 passing through slot 20. The two prongs 23 and 24 of the clamp are preferably provided with sharpened V edges 25, Fig. 5, and are preferably spaced apart a distance equal to the minimum gauge length position of gauge points 3 and 11 so that in this position the clamping force is directly opposite the gauge points. On the other hand, when the longer gauge length is employed, this bolt and nut 22 are loosened to shift clamp 21 to its dotted line position as shown at 26, Fig. 1, wherein the clamping force is symmetrically located between the gauge points.

The transverse arm 19 for supporting the clamping member 21 is suitably guided in a slot 27 formed in an arm 28, this arm extending as a continuation of the upper and lower surfaces of boss 18, Fig. 6. A clamping spring 29 is preferably disposed within a telescopic housing 30 whose outer member is secured to a head of plunger 17.

An electrical contact 31 carried by the lower end of lever 5 is normally biased into engagement with contact 32 by a spring 33 whose ends are respectively disposed in openings 34 and 35, Fig. 3, in the lever and frame side 9. Contact 32 is formed on a micrometer screw 37 which is threaded in a normally fixed bushing 36. An electrical insulation bushing 38 threadedly secured in frame 1 also supports bushing 36. The micrometer screw has threaded engagement with a backlash eliminating collar 39 which preferably has a slidable connection 40 with bushing 36 to minimize lateral displacement of the micrometer screw while a spring 41 biases collar 39 together with the micrometer screw to the right for taking up backlash therein. A pin 42 prevents rotation of collar 39 with the screw. As disclosed in my said patent, the micrometer screw may have a follow-up or restoring action from the recording apparatus through a mechanical connection 43 connected to the screw through a pin and ball connection 44.

To provide a predetermined zero position of lever 5, a stop pin 45 is eccentrically supported on a screw 46 which extends through side wall 8 and is adapted to be locked in any desired angular position by a nut 48.

The operation of my improved strain follower is apparent from the foregoing description from which it is also seen that I have provided an extremely simple, effective and durable strain follower that by reason of its improved combination of elements may be readily adapted to specimens of extremely small diameter and gauge length, and in addition may be readily adjusted to a specimen of large diameter and gauge length while still retaining its high degree of accuracy and sensitivity. The transfer to different size specimens and gauge lengths even though of very small size may be done quickly, easily and effectively with minimum adjustment of parts while still retaining the proper alignment of gauge points.

It will of course be understood that various changes in details of construction and arrangement of parts may be made by those skilled in the art without departing from the spirit of the invention as set forth in the appended claims.

I claim:

1. A strain follower comprising, in combination, a frame having a pair of axially adjustable gauge points to effect different gauge lengths, and a clamp provided with a pair of axially spaced members for engaging the specimen on the opposite side thereof, and means whereby said clamp is adapted to have a plurality of different clamping positions, one for each of said gauge lengths.

2. A strain follower comprising in combination, a frame having a plurality of gauge points adapted to be variably axially spaced to establish different gauge lengths, a clamping element having portions for engaging a specimen substantially opposite said gauge points in one gauge length thereof, and means whereby said clamp may be shifted to be disposed substantially symmetrically relative to said gauge points when the latter have a different gauge length.

3. A strain follower comprising, in combination, a frame having a vertical channel, a gauge point pivotally supported within said channel and normally having an initial position for effecting a predetermined gauge length, a second gauge point also supported within said channel, and means supported by said frame and projecting into said channel for variably controlling said initial position of said pivotal gauge point.

4. A strain follower comprising, in combination, a frame having a plurality of gauge points adapted to be variably spaced to establish different gauge lengths, a clamping element provided with a pair of axially spaced members for engaging the specimen substantially symmetrically with respect to said gauge points when arranged for one gauge length thereof, and means whereby said clamping element may be disposed substantially symmetrically relative to said gauge points when the latter have a different gauge length.

RICHARD L. TEMPLIN.